United States Patent
Kirkeby

(10) Patent No.: US 10,730,251 B2
(45) Date of Patent: Aug. 4, 2020

(54) MOLD FOR MANUFACTURING A COMPONENT FOR A WIND TURBINE

(71) Applicant: Siemens Gamesa Renewable Energy A/S, Brande (DK)

(72) Inventor: Klaus Kirkeby, Nørresundby (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 0 days.

(21) Appl. No.: 16/127,516

(22) Filed: Sep. 11, 2018

(65) Prior Publication Data

US 2019/0009478 A1   Jan. 10, 2019

Related U.S. Application Data

(62) Division of application No. 14/632,545, filed on Feb. 26, 2015, now Pat. No. 10,086,570.

(30) Foreign Application Priority Data

Mar. 10, 2014  (EP) .................................. 14158527

(51) Int. Cl.
*B29C 70/54* (2006.01)
*B29C 70/42* (2006.01)
(Continued)

(52) U.S. Cl.
CPC ............ *B29C 70/541* (2013.01); *B29C 33/14* (2013.01); *B29C 70/42* (2013.01); *B29C 33/306* (2013.01); *B29C 33/40* (2013.01); *B29C 33/68* (2013.01); *B29K 2105/08* (2013.01); *B29K 2825/06* (2013.01); *B29L 2031/085* (2013.01); *Y02P 70/523* (2015.11)

(58) Field of Classification Search
None
See application file for complete search history.

(56) References Cited

U.S. PATENT DOCUMENTS 2,417,586 A   3/1947   Crosley
2,830,647 A   4/1958   Warnken
(Continued)

FOREIGN PATENT DOCUMENTS

CN   102335982 A   2/2012
EP   2123431 A1   11/2009
(Continued)

OTHER PUBLICATIONS

Hodges, Henry. Technology in the ancient world. Brick Mold. pp. 36-37. New York: Barnes. 1992. (Year: 1992).*
(Continued)

*Primary Examiner* — Seyed Masoud Malekzadeh
*Assistant Examiner* — Manley L Cummins, IV
(74) *Attorney, Agent, or Firm* — Beusse Wolter Sanks & Maire

(57) ABSTRACT

A mold for manufacturing a component for a wind turbine, in particular a rotor blade, is provided. The mold includes a flexible mold part configured for driving staples into the same, the staples being used to attach a fiber material to the mold. The mold may include a lower mold half and an upper mold half. The mold may be made of a polymer material, a plastic material, a metal alloy or a combination thereof.

18 Claims, 3 Drawing Sheets

(51) Int. Cl.
*B29C 33/14* (2006.01)
*B29K 105/08* (2006.01)
*B29L 31/08* (2006.01)
*B29C 33/30* (2006.01)
*B29C 33/40* (2006.01)
*B29C 33/68* (2006.01)

(56) References Cited

U.S. PATENT DOCUMENTS

| | | | |
|---|---|---|---|
| 2,913,036 A | 11/1959 | Smith | |
| 3,610,457 A | 10/1971 | Opalewski | |
| 3,996,084 A | 12/1976 | Holmes | |
| 4,191,604 A | 3/1980 | MacTurk | |
| 4,808,461 A * | 2/1989 | Boyce | B32B 5/18 428/119 |
| 5,023,041 A * | 6/1991 | Jones | B29C 33/0055 164/80 |
| 5,266,249 A | 11/1993 | Grimes, III et al. | |
| 5,433,165 A * | 7/1995 | McGuiness | B29D 99/0014 114/357 |
| 5,460,673 A | 10/1995 | Cahuzac | |
| 5,466,506 A | 11/1995 | Freitas et al. | |
| 5,547,325 A * | 8/1996 | Tucker | B29C 70/12 206/345 |
| 5,626,672 A | 5/1997 | Rossetti | |
| 5,664,518 A | 9/1997 | Lewit et al. | |
| 6,103,337 A * | 8/2000 | Burgess | B29B 11/16 428/119 |
| 6,146,576 A | 11/2000 | Blackmore | |
| 7,008,689 B2 * | 3/2006 | Hawkins | B32B 3/08 428/212 |
| 7,473,385 B2 * | 1/2009 | Stiesdal | B29C 70/443 264/314 |
| 7,980,840 B2 | 7/2011 | Burchardt et al. | |
| 8,057,623 B2 | 11/2011 | Kallinen | |
| 8,191,255 B2 | 6/2012 | Kristensen et al. | |
| 9,050,786 B2 | 6/2015 | Fredskild et al. | |
| 2011/0229336 A1 | 9/2011 | Richter et al. | |
| 2011/0308907 A1 | 12/2011 | Hou | |
| 2012/0013038 A1 | 1/2012 | Stege | |
| 2012/0067515 A1 | 3/2012 | Dahl et al. | |
| 2013/0126674 A1 | 5/2013 | Guimard et al. | |
| 2013/0270729 A1 | 10/2013 | Schibsbye | |
| 2013/0330478 A1 | 12/2013 | Ushiyama et al. | |

FOREIGN PATENT DOCUMENTS

| | | |
|---|---|---|
| EP | 2311621 A1 | 4/2011 |
| EP | 2407292 A1 | 1/2012 |

OTHER PUBLICATIONS

Raptor Nails. Benefits and Applications. <https://web.archive.org/web/20110226014448/http://www.raptornails.com/app_composites.php.> Feb. 26, 2011. Retrieved Online Sep. 24, 2019.—teaches the use of these nails with fiberglass lay-up an wind turbine blades. (Year: 2011).*

EP search report dated Jul. 25, 2014, for EP patent application No. 14158527.3.

* cited by examiner

MOLD FOR MANUFACTURING A COMPONENT FOR A WIND TURBINE

CROSS REFERENCE TO RELATED APPLICATIONS

This application is a divisional of and claims priority to pending U.S. application Ser. No. 14/632,545, filed Feb. 26, 2015, and claims the benefit of European Application No. EP14158527 filed Mar. 10, 2014, both incorporated by reference herein in their entireties.

FIELD OF INVENTION

The present invention relates to a mold for manufacturing a component for a wind turbine.

BACKGROUND OF INVENTION

Modern wind turbine rotor blades are built from fiber-reinforced plastics. A rotor blade typically comprises an airfoil having a rounded leading edge and a sharp trailing edge. To produce such a rotor blade, fiber material is laid onto a mold and subsequently infiltrated with a resin.

SUMMARY OF INVENTION

It is one object of the present invention to provide an improved method and mold for manufacturing a component for a wind turbine.

Accordingly, a method for manufacturing a component for a wind turbine, in particular a rotor blade, is provided. The method comprises the steps of a) laying a fiber material onto a mold, b) attaching the fiber material to the mold and/or to a core of the component using staples, c) infiltrating the fiber material with a resin, and d) curing the resin to form the component.

The method is advantageous in that a lack of consolidation of the component, in particular the rotor blade, is prevented or reduced. Due to the fact that the fiber material is attached to the mold, the fiber material is always in contact with a surface of a mold cavity. This prevents a poor consolidation of the resin infiltrated fiber material due to complex mold geometries. In particular, in a section of the mold cavity which constitutes the leading edge of the rotor blade, the staples which attach the fiber material close to the mold prevent the formation of a gap between the fiber material and the mold cavity. Dry fibers, i.e. non-impregnated fibers, air bubbles in the impregnated fiber material and/or accumulations of resin in the leading edge of the rotor blade are therefore avoided or reduced.

The curing of the resin may be done under pressure and high temperatures, for example in an autoclave. For attaching the fiber material to the mold a staple gun may be used. Examples of a resin which may be used for impregnating the fiber material are epoxy, polyester, vinylester or any other suitable thermoplastic or duroplastic material. The fiber material may comprise glass fibers, carbon fibers, aramid fibers or the like. Preferably the fiber material is made of glass fibers. The fiber material may be provided in the form of woven or knitted mats, as unidirectional fiber mats, rovings or the like.

The impregnation of the fiber material with resin can be done in a vacuum assisted resin transfer molding (VARTM) process. Alternatively, the fiber material may be supplied in a pre-impregnated state (so-called prepreg material) in step a). Of course, when using a prepreg material, there is no need to inject the fiber material with resin.

Generally speaking, the mold may be an open or a closed mold. For example, the mold may comprise one or more parts, in particular a lower part and an upper part.

"Cured" or "set" refers to a resin being hardened and/or cross-linked to an extent where the shape of the fiber material impregnated with the resin will not or not change significantly any more.

"a)", "b)", "c)" and "d)" are not to imply a fixed order of the method steps. Rather, the steps a) to c) may be carried out in a different order where appropriate in the mind of the skilled person.

According to an embodiment, in step b) the fiber material is attached to a flexible mold part into which the staples are driven.

Presently, "flexible" means that the material of the flexible mold part may be easily penetrated by the staples.

According to a further embodiment, the flexible mold part is made of polymer material.

The flexible mold part is for example made of polystyrene (PS). In particular, the flexible mold part may be made from a foamed polymer to ease the penetration of the staples into the flexible mold part.

According to a further embodiment, in step a) before laying the fiber material on the mold, the flexible mold part is covered with a foil.

Preferably, the foil is a polymer foil. The foil acts as a release foil which prevents the resin from sticking to the flexible mold part. The foil is configured removable for an easy replacement thereof. The foil may be made of polytetrafluoroethylene (PTFE), polypropylene (PP), silicone, polyethylene (PE) or the like.

According to a further embodiment, the component is a rotor blade, wherein in step b) the fiber material corresponding to a leading edge of the rotor blade is attached to the flexible mold part.

This prevents a lack of consolidation in the leading edge.

According to a further embodiment, in step b) the fiber material is attached to a lower mold half.

In particular, the mold includes also an upper mold half in an embodiment. The mold halves are separated in a plane of separation. Additionally, also the upper mold half may be equipped with a flexible mold part.

According to a further embodiment, after removing the cured component form the mold, portions of the staples that protrude from the component are removed.

This ensures a smooth surface of the component.

According to a further embodiment, the portions of the staples that protrude from the component are removed by grinding.

According to a further embodiment, the staples are made of a polymer material.

The staples may have a C-shape or pin-shape, for example. In particular, the staples may be made of a glass-fiber reinforced polyamide.

Further, a mold for manufacturing a component for a wind turbine, in particular a rotor blade, is provided. The mold may be used in the method described above.

The mold comprises a flexible mold part configured for driving staples into the same, the staples being used to attach a fiber material to the mold. The mold may include a lower mold half and an upper mold half. The mold may be made of a polymer material, a plastic material, a metal alloy or a combination thereof. This ensures sufficient stability and durability of the mold. The mold has a mold cavity which constitutes a negative of the component to be manufactured. The mold cavity may be provided in both mold halves.

According to an embodiment, the flexible mold part is arranged in a lower mold half of the mold.

This enables an easy application of the staples before closing the mold with the upper mold half.

According to a further embodiment, the flexible mold part is configured removable from the mold.

The flexible mold part may be screwed, glued or clamped to the mold. This has the effect, that the flexible mold part may easily be replaced when it is worn out due to multiple attachment of fiber material to the flexible mold part with staples.

According to a further embodiment, the flexible mold part is made of a polymer material.

The flexible mold part is for example made of PS. In particular, the flexible mold part may be made from a foamed polymer to ease the penetration of the staples into the flexible mold part.

According to a further embodiment, the flexible mold part is arranged adjacent to a plane of separation of the mold.

This enables an attachment of the fiber material directly at the plane of separation.

According to a further embodiment, the component is a rotor blade and the flexible mold part is positioned inside the mold so as to correspond to a leading edge of the rotor blade.

This improves the consolidation in the area of the leading edge of the rotor blade.

"Wind turbine" presently refers to an apparatus converting the wind's kinetic energy into rotational energy, which may again be converted to electrical energy by the apparatus.

The embodiments and features described in relation to the method equally apply to the mold, and vice versa.

Further possible implementations or alternative solutions of embodiments of the invention also encompass combinations—that are not explicitly mentioned herein—of features described above or below with regard to the embodiments. The person skilled in the art may also add individual or isolated aspects and features to the most basic form of the invention.

BRIEF DESCRIPTION OF THE DRAWINGS

Further embodiments, features and advantages of the present invention will become apparent from the subsequent description and dependent claims, taken in conjunction with the accompanying drawings, in which:

DETAILED DESCRIPTION OF INVENTION

Figure 1:
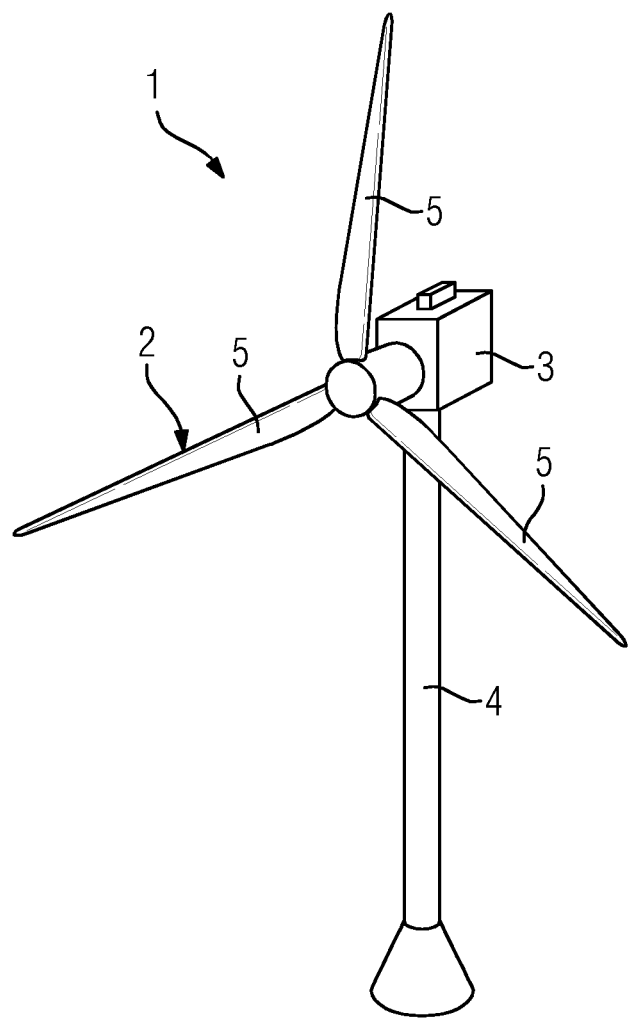
FIG. 1 shows a perspective view of a wind turbine according to one embodiment.

In the Figures, like reference numerals designate like or functionally equivalent elements, unless otherwise indicated.

FIG. 1 shows a wind turbine 1 according to an embodiment.

The wind turbine 1 includes a rotor 2 connected to a generator (not shown) arranged inside a nacelle 3. The nacelle 3 is arranged at the upper end of a tower 4 of the wind turbine 1.

The rotor 2 includes three blades 5. Rotors 2 of this kind may have diameters ranging from, for example, 30 to 160 meters. The blades 5 are subjected to high wind loads. At the same time, the blades 5 need to be lightweight. For these reasons, blades 5 in modern wind turbines 1 are manufactured from fiber-reinforced composite materials. Therein, glass fibers are generally preferred over carbon fibers for cost reasons. In addition, the blades 5 each comprise one or more core members made of a light material to reduce the weight of the blades 5.

Figure 2:
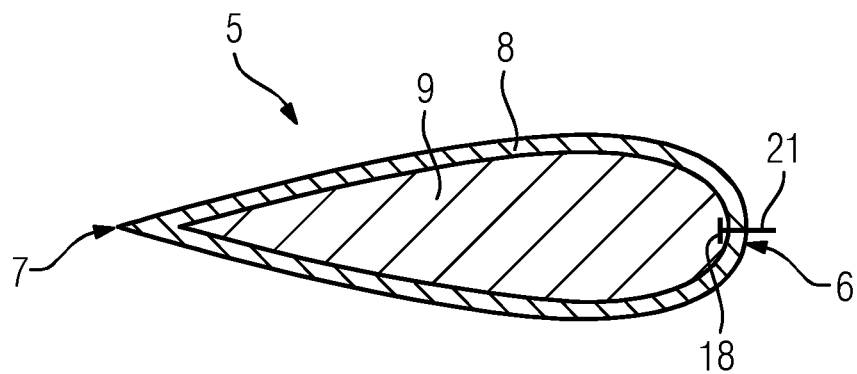
FIG. 2 shows a sectional view of a turbine blade according to one embodiment.

FIG. 2 shows a sectional view of a blade 5 according to an embodiment.

The blade 5 comprises a shell or airfoil 8 having a rounded leading edge 6 and a sharp trailing edge 7. The airfoil 8 is made from a fiber-reinforced composite material. The fiber-reinforced material comprises a fiber material and a matrix material in which the fiber material is embedded. The matrix material is a resin. Examples of a resin which may be used for impregnating the fiber material are epoxy, polyester, vinylester or any other suitable thermoplastic or duroplastic material.

The fiber material may comprise glass fibers, carbon fibers or the like. Preferably, in one embodiment, the fiber material is made of glass fibers. The fiber material may be provided in the form of woven or knitted mats, as unidirectional fiber mats, rovings or the like. The fiber material may be provided in the form of non-impregnated, i.e. dry, mats or in the form of so-called prepregs. Preferably, the fiber material is initially not impregnated with resin and will be impregnated when placed in a mold. The impregnation of the fiber material with resin can be done in a vacuum assisted resin transfer molding (VARTM) process. The airfoil 8 may be hollow or at least filled partly with a core member or core 9. The core 9 comprises wood or a polymer material, in particular a polymeric foam material. The foam material may comprise polyurethane (PU), polyvinyl chloride (PVC), polyethylene terephthalate (PET), polybutylene terephthalate (TBT) or the like.

Figure 3:
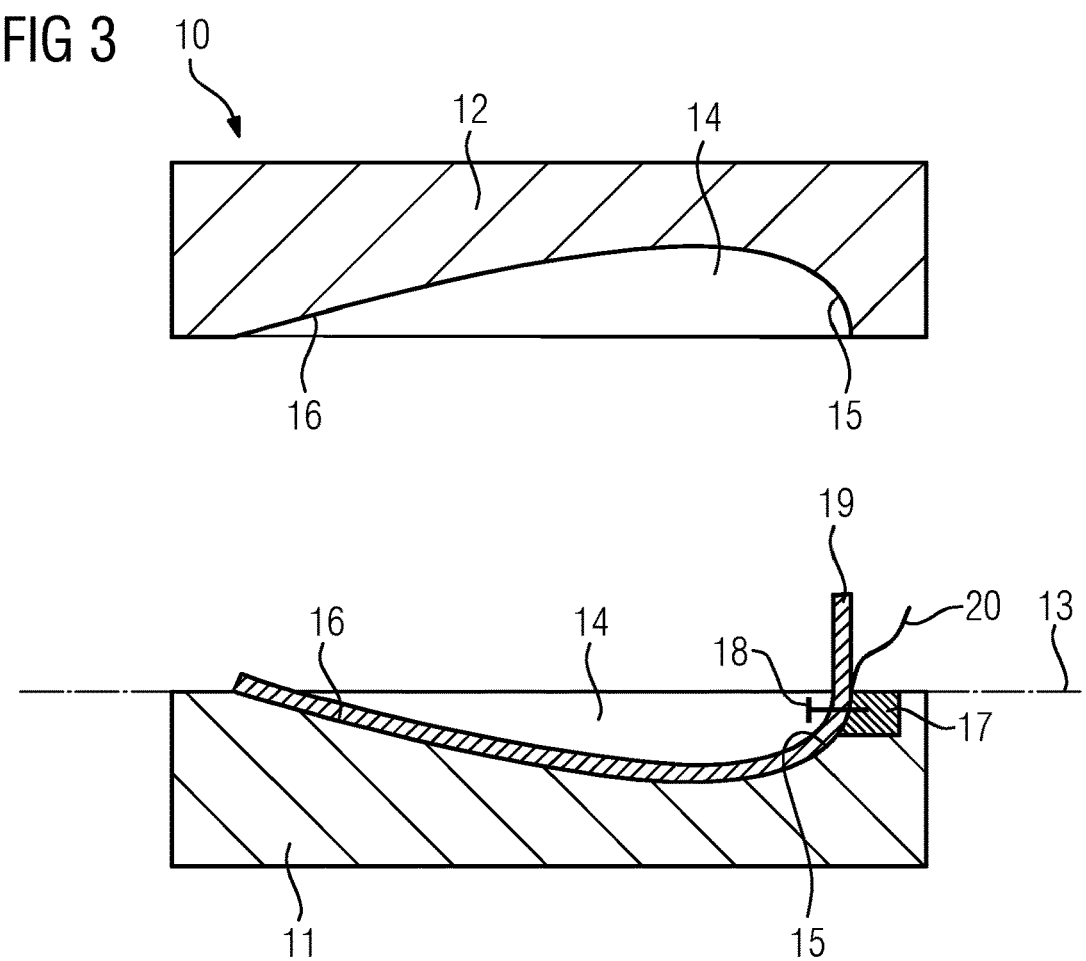
FIG. 3 shows a sectional view of a mold for manufacturing a turbine blade according to one embodiment.
Figure 4:
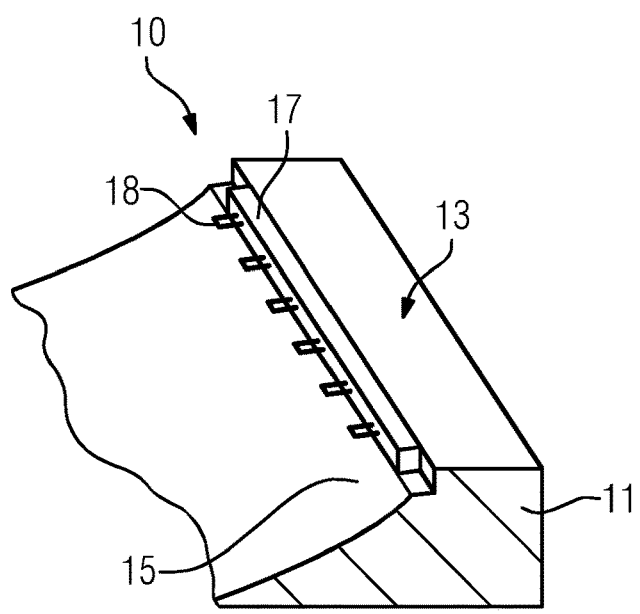
FIG. 4 shows a perspective view of the mold according to FIG. 3.

FIG. 3 shows a sectional view, and FIG. 4 shows a perspective view of a mold 10 for manufacturing a rotor blade 5 according to an embodiment.

The mold 10 comprises a lower mold half 11 and an upper mold half 12. The mold halves 11, 12 are separated in a plane of separation 13. FIG. 3 shows the mold 10 in an open status. When the mold 10 is closed, the mold halves 11, 12 are positioned on each other to form a mold cavity 14 which has the shape of the drop-shaped profile of the blade 5. The mold cavity 14 is constituted by both mold halves 11, 12. In particular, each half 11, 12 has a section 15 which corresponds to the leading edge 6 of the blade 5 and a section 16 which corresponds to the trailing edge 7 of the blade 5. The mold halves 11, 12 can be made of metal like aluminum, plastic material, a fiber composite material or a combination thereof.

The mold 10 comprises a flexible mold part 17 which is configured for driving staples 18 into the same, the staples 18 being used to attach a fiber material 19 to the mold 10, in particular to the lower mold half 11. The fiber material 19 may comprise a plurality of fiber mats that are arranged on top of each other. The flexible mold part 17 may be part of the lower mold half 11. The upper mold half 12 may also comprise a flexible mold part 17. For attaching the fiber material 19 to the flexible mold part 17 a staple gun may be used. The flexible mold part 17 is preferably made of a plastic material, for example polystyrene (PS). In particular, the flexible mold part 17 is made of a foamed polymer to ease the penetration of the staples 18 into the flexible mold part 17. Presently, "flexible" means that the material of the flexible mold part 17 may be easily penetrated by the staples 18.

The staples 18 are preferably made of a polymer material. The staples are U-shaped or pin-shaped, for example. For example the staples 18 may be made of a glass-fiber reinforced polyamide. The staples 18 may also be uses to attach the fiber material 19 to the core 9 of the blade.

As can be seen from FIG. 4, the flexible mold part 17 is a flat rod which extends in a longitudinal direction of the lower mold half 11. A plurality of staples 18 is used to attach the fiber material 19 to the flexible mold part 17. In particular, the flexible mold part 17 is positioned inside the mold 10 so as to correspond to the leading edge 6 of the rotor blade 5. This means, that the flexible mold part 17 is positioned in the section 15 of the lower mold half 11 and/or the upper mold half 12. In particular, the flexible mold part 17 is arranged adjacent to the plane of separation 13 of the mold 10. Alternatively or additionally, the flexible mold part 17 may be positioned at other areas of the mold 10. In particular, the flexible mold part 17 is positioned in other areas of the mold 10 where the fiber material 19 is laid down on sharp geometries of the mold 10. This is to ensure that the fiber material 19 always is in contact with a surface of the mold cavity 14.

The flexible mold part 17 is preferably removable from the mold 10. The flexible mold part 17 can be screwed, glued or clamped to the mold 10. This has the effect, that the flexible mold part 17 may easily be replaced when it is worn out due to multiple attachment of fiber material 19 to the flexible mold part 17 with staples 18.

Between the fiber material 19 and the flexible mold part 17 is provided a release foil 20 which prevents the resin from sticking to the flexible mold part 17. The foil 20 is removable for an easy replacement. The foil 20 may be made of a polymer, for example polytetrafluoroethylene (PTFE), polypropylene (PP), silicone, polyethylene (PE) or the like.

Figure 5:
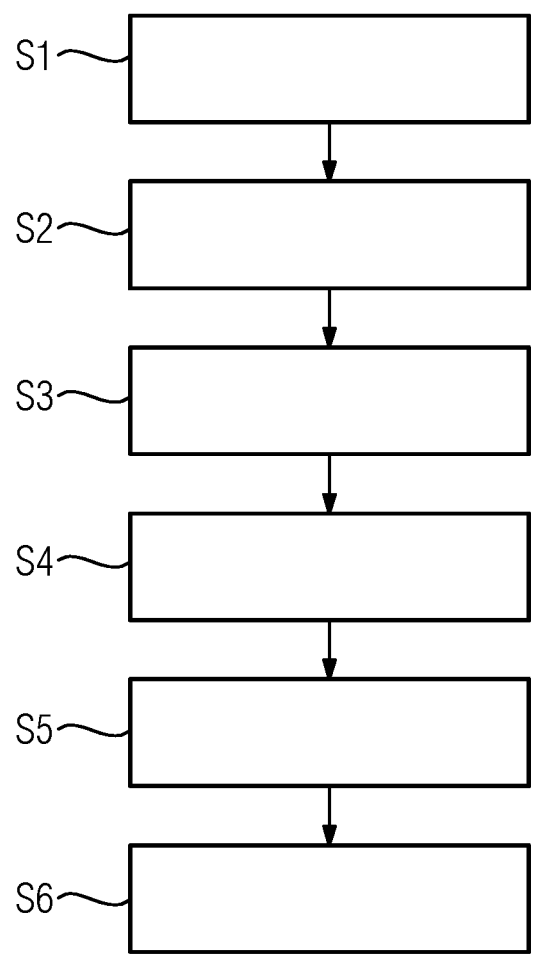
FIG. 5 shows a flow diagram of a method for manufacturing a turbine blade according to one embodiment.

FIG. 5 shows a flow diagram of a method for manufacturing a component, in particular a rotor blade 5, according to an embodiment.

In step S1, the fiber material 19 is laid onto the mold 10. In particular, the fiber material 19 is laid onto the lower mold half 11. Before laying the fiber material 19 on the mold 10, the flexible mold part 17 is covered with a foil 20, also referred to as a release foil. The foil 20 is configured to be easily removable from the mold 10 to enable replacement thereof. The foil 20 prevents the fiber material 19 from sticking to the flexible mold part 17 after impregnating the fiber material with a resin.

Subsequently, in step S2 the fiber material 19 is attached to the mold 10, in particular to the flexible mold part 17 of the lower mold half 11, using staples 18. The staples 18 are driven into the flexible mold part 17. In step S2, the fiber material 19 corresponding to the leading edge 6 of the rotor blade 5 is attached to the flexible mold part 17. Additionally or as an alternative to attaching the fiber material 19 to the flexible mold part 17, the fiber material 19 may be attached to the core 9 of the component using staples 18. In this case, the core 9 may comprise a flexible material, e.g. polymeric foam or any other flexible material as described herein.

It is to be noted that the core 9 is optional. The core 9 may be placed on the fiber material 19 that is applied to the lower mold half 11. The core 9 is subsequently covered with the fiber material 19 to enclose the core 9 in the fiber material 19. The mold 10 is closed when the fiber material 19 and the core 9 are placed in the mold 10.

In step S3, the fiber material 19 is impregnated with a resin. This may be done in a VARTM process. This process may involve using a vacuum bag as well as a suction pump which are not shown in the figures.

After impregnating the fiber material 19 with resin, the resin is cured to form the component of the wind turbine 1, i.e. the blade 5, in step S4. The impregnated fiber material 19 may be cured, e.g. in an autoclave, by adding pressure and/or heat.

Subsequently, in step S5, the blade 5 is removed from the mold.

After step S5, portions 21 (see FIG. 2) of the staples 18 that protrude from the blade 5 are removed in a step S6. This can be done by grinding.

The mold 10 and the method are advantageous in that due to the fact that the fiber material 19 is attached to the mold 10, the fiber material 19 is always in contact with a surface of the mold cavity 14. This prevents a poor consolidation of the resin infiltrated fiber material 19 due to complex mold geometries. In particular, in the section 15 of the mold cavity 14 which constitutes the leading edge 6 of the blade 5 and which is separated by the plane of separation 13, the staples 18 which attach the fiber material 19 close to the mold 10 prevent the existence of a gap between the fiber material 19 and the mold cavity 14. Thus, a lack of consolidation of the resin impregnated fiber material 19 is avoided. This means, dry fibers, i.e. non-impregnated fibers, air bubbles in the impregnated fiber material 19 and/or accumulation of resin in the leading edge 6 of the blade is prevented.

Although the present invention has been described in accordance with preferred embodiments, it is obvious for the person skilled in the art that modifications are possible in all embodiments.

The invention claimed is:

1. A mold for manufacturing a component for a wind turbine, comprising:
    a first mold part, a flexible mold part, and a second mold part;
    wherein when assembled together the first mold part, the flexible mold part, and the second mold part form a closed mold comprising an inner surface;
    wherein the first mold part, the flexible mold part, and the second mold part each define a respective portion of the inner surface;
    wherein the inner surface forms a shape of an outer surface of an airfoil;
    wherein the flexible mold part is disposed at a plane of separation between the first mold part and the second mold part; and
    wherein a portion of the inner surface defined by the flexible mold part is softer than a portion of the inner surface defined by the first mold part.

2. The mold according to claim 1,
    wherein the flexible mold part is arranged in the first mold part, wherein the first mold part constitutes a lower mold half of the mold.

3. The mold according to claim 1,
    wherein the flexible mold part is configured to be removable from the first mold part.

4. The mold according to claim 1,
    wherein the flexible mold part is made of a polymer material.

5. The mold according to claim 1,
wherein the flexible mold part is disposed at a position along the inner surface that corresponds with a leading edge of the shape of the outer surface of the airfoil.

6. The mold according to claim 1,
wherein the airfoil is an airfoil of a rotor blade of a wind turbine.

7. A mold for manufacturing a component for a wind turbine, comprising:
- a first outer mold part comprising a first mold part and a flexible mold part, wherein the first outer mold part is formed by installing the flexible mold part in the first mold part in a fixed position relative to the first mold part, and
- a second outer mold part secured to the first outer mold part to form a closed outer mold,
- wherein a portion of an outer surface of the flexible mold part defines part of an airfoil-shaped inner surface of the closed outer mold,
- wherein the flexible mold part and the first mold part together define an interface configured to abut the second outer mold part when the first outer mold part is secured to the second outer mold part; and
- wherein the first outer mold part is constructed such that staples can be inserted into the portion of the outer surface of the flexible mold part through a fiber material disposed on the airfoil-shaped inner surface before the second outer mold part is secured to the first outer mold part.

8. The mold according to claim 7,
wherein the flexible mold part comprises a polymer material.

9. The mold according to claim 7, further comprising a foil configured to cover the airfoil-shaped inner surface of the closed outer mold.

10. The mold according to claim 7,
wherein the airfoil is an airfoil of a rotor blade of a wind turbine.

11. The mold according to claim 10,
wherein the flexible mold part is disposed at a position along the airfoil-shaped inner surface that corresponds with a leading edge of the airfoil-shaped inner surface.

12. The mold according to claim 7,
wherein the first outer mold part is a lower mold half.

13. The mold according to claim 7,
further comprising the staples, wherein the staples comprise a polymer material.

14. The mold according to claim 1, further comprising staples driven into the flexible mold part through a surface of the flexible mold part that forms the respective portion of the inner surface.

15. The mold according to claim 4, wherein the polymer material comprises a foamed polymer material.

16. The mold according to claim 7, further comprising the staples that are driven into the flexible mold part through the portion of the outer surface of the flexible mold part that defines part of the airfoil-shaped inner surface of the closed outer mold.

17. The mold according to claim 1, wherein the flexible mold part and the first mold part together define an interface configured to abut the second mold part when the first mold part is secured to the second mold part.

18. The mold according to claim 17, wherein the flexible mold part comprises a flat rod that extends in a longitudinal direction of the first mold part.

* * * * *